(12) United States Patent
Copp et al.

(10) Patent No.: US 12,741,700 B2
(45) Date of Patent: Sep. 22, 2026

(54) CLAMP FOR TONNEAU COVER

(71) Applicant: Peragon Enterprises, Inc., Shell Lake, WI (US)

(72) Inventors: Heath Copp, Trego, WI (US); Cory Robinson, Shell Lake, WI (US)

(73) Assignee: Peragon Enterprises, Inc., Shell Lake, WI (US)

( * ) Notice: Subject to any disclaimer, the term of this patent is extended or adjusted under 35 U.S.C. 154(b) by 154 days.

(21) Appl. No.: 18/769,836

(22) Filed: Jul. 11, 2024

(65) Prior Publication Data

US 2025/0019014 A1 Jan. 16, 2025

Related U.S. Application Data

(60) Provisional application No. 63/526,060, filed on Jul. 11, 2023.

(51) Int. Cl.
*B62D 33/04* (2006.01)
*F16B 2/18* (2006.01)

(52) U.S. Cl.
CPC .............. *B62D 33/04* (2013.01); *F16B 2/185* (2013.01)

(58) Field of Classification Search
CPC ................................ B62D 33/04; F16B 2/185
See application file for complete search history.

(56) References Cited

U.S. PATENT DOCUMENTS

| | | | | |
|---|---|---|---|---|
| 6,076,881 | A * | 6/2000 | Tucker | B60J 7/141 296/100.1 |
| 6,752,449 | B1 | 6/2004 | Wheatley | |
| 6,808,221 | B2 | 10/2004 | Wheatley | |
| 8,690,224 | B2 | 4/2014 | Maimin et al. | |
| 9,346,344 | B2 * | 5/2016 | Smith | B60P 7/02 |
| 9,764,628 | B2 * | 9/2017 | Facchinello | B60J 7/141 |
| 10,471,879 | B1 | 11/2019 | Copp et al. | |
| 10,746,209 | B2 | 8/2020 | Voegele et al. | |
| 10,800,234 | B2 | 10/2020 | Dylewski, II et al. | |
| 11,446,995 | B2 | 9/2022 | Dylewski, II et al. | |
| 12,533,935 | B2 * | 1/2026 | Dylewski, II | B60J 7/198 |
| 2017/0066311 | A1 * | 3/2017 | Facchinello | B60J 7/198 |
| 2021/0213814 | A1 * | 7/2021 | Shi | B60J 7/198 |
| 2023/0013667 | A1 | 1/2023 | Dylewski, II et al. | |

FOREIGN PATENT DOCUMENTS

| | | | |
|---|---|---|---|
| CA | 2853592 | C * | 9/2021 |

* cited by examiner

*Primary Examiner* — Faye M Fleming
(74) *Attorney, Agent, or Firm* — Merchant & Gould P.C.

(57) ABSTRACT

A clamp for a tonneau cover including a leveling feature intended to enhance the fit between a tonneau cover and a pickup truck bed. The clamp includes a first and second jaw member capable of pivoting between open and clamping positions, allowing the first and second jaw members to securely grip a section of the pickup truck. Additionally, the clamp defines a mounting surface that serves as a platform for attaching various tonneau cover components, effectively connecting the cover to the pickup truck bed. To achieve optimal alignment, the clamp includes a first and second lever that can be adjusted by applying opposing forces to enable modification the planar angle of the mounting surface, facilitating the leveling of all mounting surfaces among the clamps attached to the pickup truck.

22 Claims, 16 Drawing Sheets

110
108

110
112
140
108

CLAMP FOR TONNEAU COVER

CROSS-REFERENCE TO RELATED APPLICATIONS

This application claims the benefit of U.S. Provisional Application No. 63/526,060, filed Jul. 11, 2023, and titled "CLAMP FOR TONNEAU COVER" the disclosure of which is hereby incorporated herein by reference.

TECHNICAL FIELD

The present disclosure relates generally to vehicle accessories, and more particularly to a clamp with adjustable leveling features for securing a tonneau cover to a pickup truck bed.

BACKGROUND

Pickup trucks are equipped with a specialized cargo area called a pickup truck box, which is typically positioned towards the rear end of the vehicle and located behind the cab. The factory-delivered pickup truck box features an opening located behind its front wall and between the right and left sidewalls. At the rear end of the pickup truck box, an end gate is usually present, positioned between the right and left sidewalls. The end gate can be folded open, pivoting about an axis adjacent to the bed of the pickup truck box. The front wall, sidewalls, and end gate of the pickup truck box extend upwards from the bed.

The opening of the pickup truck box allows for transportation of irregularly shaped or large objects that may extend above the tops of the front wall, sidewalls, and end gate. This feature enables objects to protrude above the cab of the pickup truck. However, the opening of the pickup truck box lacks the enclosed storage capability often desired for keeping various items secure. Additionally, the opening of the pickup truck box can lead to increased aerodynamic drag on the vehicle, resulting in higher fuel consumption, increased costs, and elevated environmental pollution.

To address these limitations, various pickup truck box covers have been developed and are available in the market. These covers typically span the opening of the pickup truck box, extending around its perimeter. They are designed to cover or substantially cover the opening and may include locking mechanisms to secure the cover in the extended configuration. Pickup truck box covers often feature a retractable design, allowing them to be folded or moved out of the way to uncover the opening partially or entirely. In some cases, the pickup truck box cover can be completely removed, freeing up the entire or a substantial portion of the pickup truck box for unrestricted use.

Peragon Enterprises, Inc., located in Spooner, Wisconsin, provides retractable cover systems designed for covering the openings of pickup truck boxes. Retractable cover systems for pickup truck boxes are described in U.S. Pat. Nos. 10,471,879 and 10,654,346, both issued to Copp et al., on Nov. 12, 2019, and May 19, 2020, respectively. The disclosures of these patents are incorporated by reference herein.

The retractable cover systems are typically affixed to the bed of the pickup truck via a plurality of clamps. Challenges often occur in achieving a level mounting of the retractable cover systems relative to the truck bed. Such challenges are primarily attributable to manufacturing tolerances, which introduce dimensional and angular variations among different pickup truck boxes. As a result, establishing a level mounting surface defined by the clamps can prove problematic, often leading to alignment discrepancies between the tonneau cover and the truck bed, which can compromise the functionality and aesthetic appeal of the retractable cover system.

SUMMARY

Some aspects of the disclosure are directed to a clamp with unique leveling features designed to improve the fit between a tonneau cover and the bed of a pickup truck. The clamp includes a first jaw member and a second jaw member, capable of pivoting relative to each other between an open position and a clamping position. In the clamping position, the first and second jaw members securely grip a portion of the pickup truck. The clamp also includes a mounting surface that serves as a platform for attaching other parts of the tonneau cover, thereby connecting the tonneau cover to the bed of the pickup truck.

Due to manufacturing tolerances in current vehicle production, there are slight variations in dimensions and angles within the pickup truck bed among different trucks, and sometimes even within the same vehicle. As a result, when clamps are attached to the pickup truck, their mounting surfaces may not be level with one another. To address this issue, the clamp incorporates a first and second lever which can be manipulated through the application of opposing forces, thereby adjusting the planar angle of the mounting surface of each clamp, to enable for leveling of the mounting surfaces among the clamps attached to the pickup truck.

Aspects of the present disclosure relate to a clamp for securing a portion of a tonneau cover to a flange of a pickup truck box, including a first jaw member defining a first contact surface configured to contact the flange of the pickup truck box, a second jaw member pivotably coupled to the first jaw member, the second jaw member defining a second contact surface configured to contact the flange of the pickup truck box, wherein the second contact surface is oriented toward the first contact surface, a threaded member operably coupled to the first jaw member and the second jaw member, and configured to pivot the second jaw relative to the first jaw to adjust a distance between the first contact surface and the second contact surface to selectively exert a gripping pressure on the flange of the pickup truck box, a bracket member including a first portion operably coupleable to the first jaw member and a second portion extending away from the first portion at an angle, the second portion defining a mounting surface for the portion of the tonneau cover, a first lever arm configured to selectively mate with the bracket member. and a second lever arm configured to selectively mate with the first jaw member, wherein application of opposing forces on the first and second lever arms enable adjustment of the angle between the first portion and the second portion of the bracket member to enable leveling of the mounting surface for an improved fit of the tonneau cover to the pickup truck box.

In certain implementations, the first jaw member defines a third contact surface oriented substantially orthogonal to the first contact surface. In certain implementations, the second contact surface defined by the second jaw member defines knurling, teeth or serrations configured to increase the frictional resistance between the second contact surface and the flange of the pickup truck box. In certain implementations, the second contact surface defined by the second jaw member is curved for improved contact with the flange of the pickup truck box over a range of pivot angles between the first jaw member and the second jaw member. In certain implementations, the first jaw member defines an aperture shaped and sized to enable a portion of the threaded member to pass therethrough. In certain implementations, the second jaw member defines a threaded aperture for receipt of a portion of the threaded member. In certain implementations, the first jaw member defines a first portion of a pivot assembly and the second jaw member defines a second portion of the pivot assembly pivotably coupling the first jaw member to the second jaw member. In certain implementations, the first jaw member is configured to pivot relative to the second jaw over a range of less than about 45°.

In certain implementations, the first jaw member defines a bracket member channel configured to receive a portion of the bracket member to establish three contact surfaces between the first jaw member and the bracket member, wherein a first and second surface oppose one another and the third surface is orthogonal to the first and second surfaces. In certain implementations, the bracket member defines a first lever arm channel configured to receive a portion of the first lever arm to establish three contact surfaces between the bracket member and the first lever arm, wherein a first and second surface oppose one another and the third surface is orthogonal to the first and second surfaces. In certain implementations, the first lever arm is keyed to fit within the first lever arm channel to inhibit lateral motion of the first lever arm relative to the bracket member when the first lever arm is inserted into the first lever on channel.

In certain implementations, the mounting surface of the bracket member defines an aperture configured to receive a fastener for securing the portion of the tonneau cover to the bracket member. In certain implementations, the first lever arm defines a cutout configured to enable insertion of the fastener into the aperture defined by the mounting surface of the bracket member when the first lever arm is positioned within the first lever arm channel. In certain implementations, the first jaw member defines a second lever arm channel configured to receive a portion of the second lever arm to establish three contact surfaces between the first jaw member and the second lever arm, wherein a first and second surface oppose one another and the third surface is orthogonal to the first and second surfaces. In certain implementations, the first lever arm channel is angled relative to the second lever arm channel.

In certain implementations, the second lever arm defines a bend configured to promote a static equilibrium of the second lever arm relative to the first jaw member when the second lever arm is inserted into the second lever arm channel to inhibit the second lever arm from falling out of the second lever arm channel when left unattended. In certain implementations, one or more features of at least one of the first jaw member or the second jaw member are defined by an extrusion process.

In certain implementations, the first jaw member defines a first width, and the second jaw member defines a second width, wherein the second width is greater or equal to the first width. In certain implementations, the clamp further includes a stabilizer bar threadably coupled to the second jaw member, wherein the stabilizer bar defining a contact portion configured to contact a portion of the pickup truck box.

Another aspect of the present disclosure relates to a tonneau cover clamp, including: a first jaw member; a second jaw member pivotably coupled to the first jaw member; a threaded member configured to pivot the second jaw relative to the first jaw to exert a gripping pressure; a bracket member including a first portion operably coupleable to the first jaw member and a second portion extending away from the first portion at an angle, the second portion defining a mounting surface for the tonneau cover; a first lever arm configured to selectively mate with the bracket member; and a second lever arm configured to selectively mate with the first jaw member to enable adjustment of the angle between the first portion and the second portion of the bracket member.

In certain implementations, the first jaw member defines a first contact surface and the second jaw member defines a second contact surface, and wherein the second contact surface is oriented toward the first contact surface.

Another aspect of the present disclosure relates to a method of leveling a mounting surface of a tonneau cover clamp, including: rotating a threaded member configured to pivot a first jaw member relative to a second jaw member to exert a gripping force between the first jaw member and the second jaw member on a portion of a pickup truck box, wherein a bracket member defining a mounting surface is operably coupled to the first jaw member; inserting a first lever arm into a channel defined by the bracket member; inserting a second lever arm into a channel defined by the first jaw member; and applying an opposing force on the first and second lever arms, thereby causing the bracket member to bend for leveling of the mounting surface.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
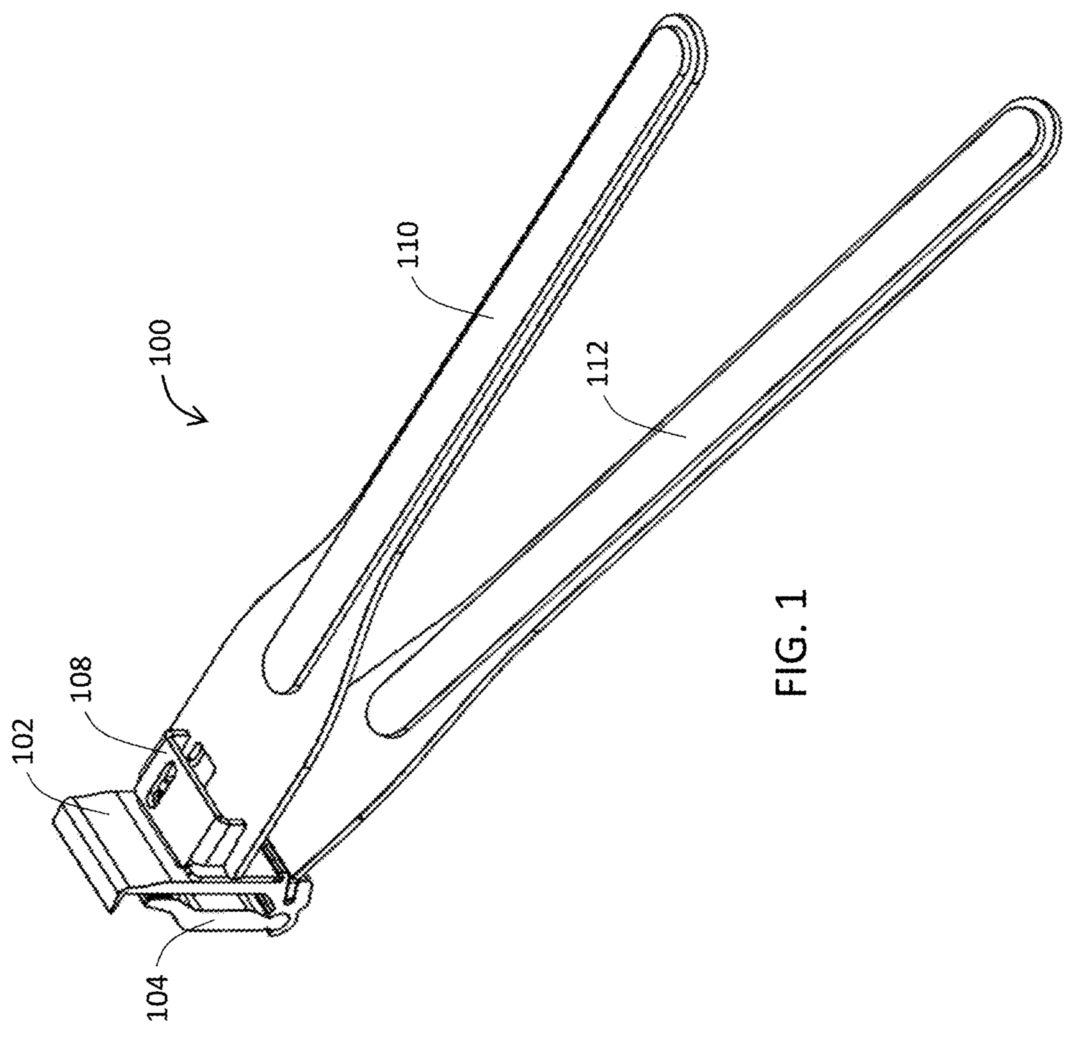
FIG. 1 is a perspective view of a clamp having a lever adjustable mounting surface for securing a portion of a tonneau cover to a pickup truck box, in accordance with an embodiment of the disclosure.
Figures 2, 3:
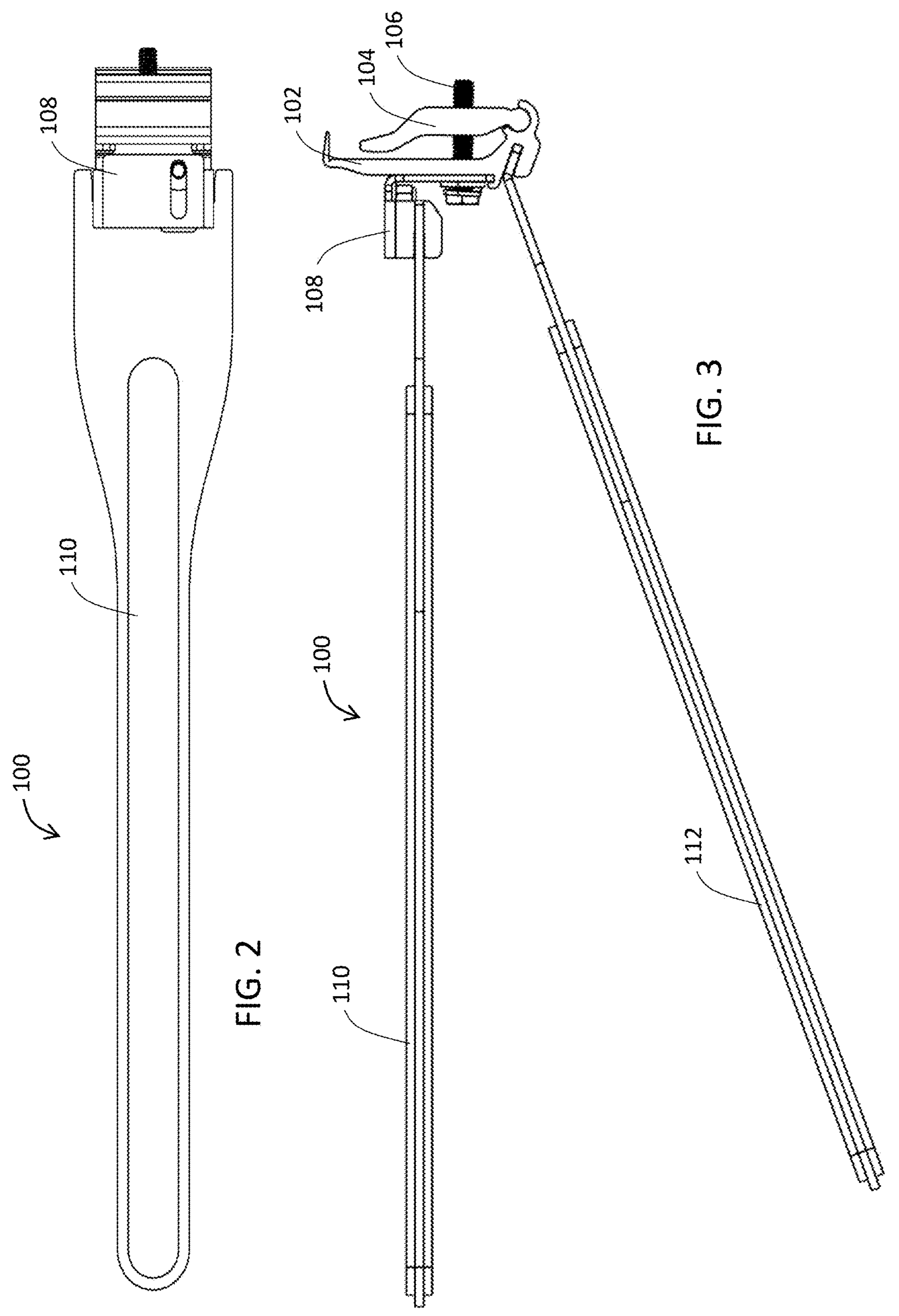
FIG. 2 is a top view of the clamp of FIG. 1.
FIG. 3 is a right side profile view of the clamp of FIG. 1.
Figures 4, 5:
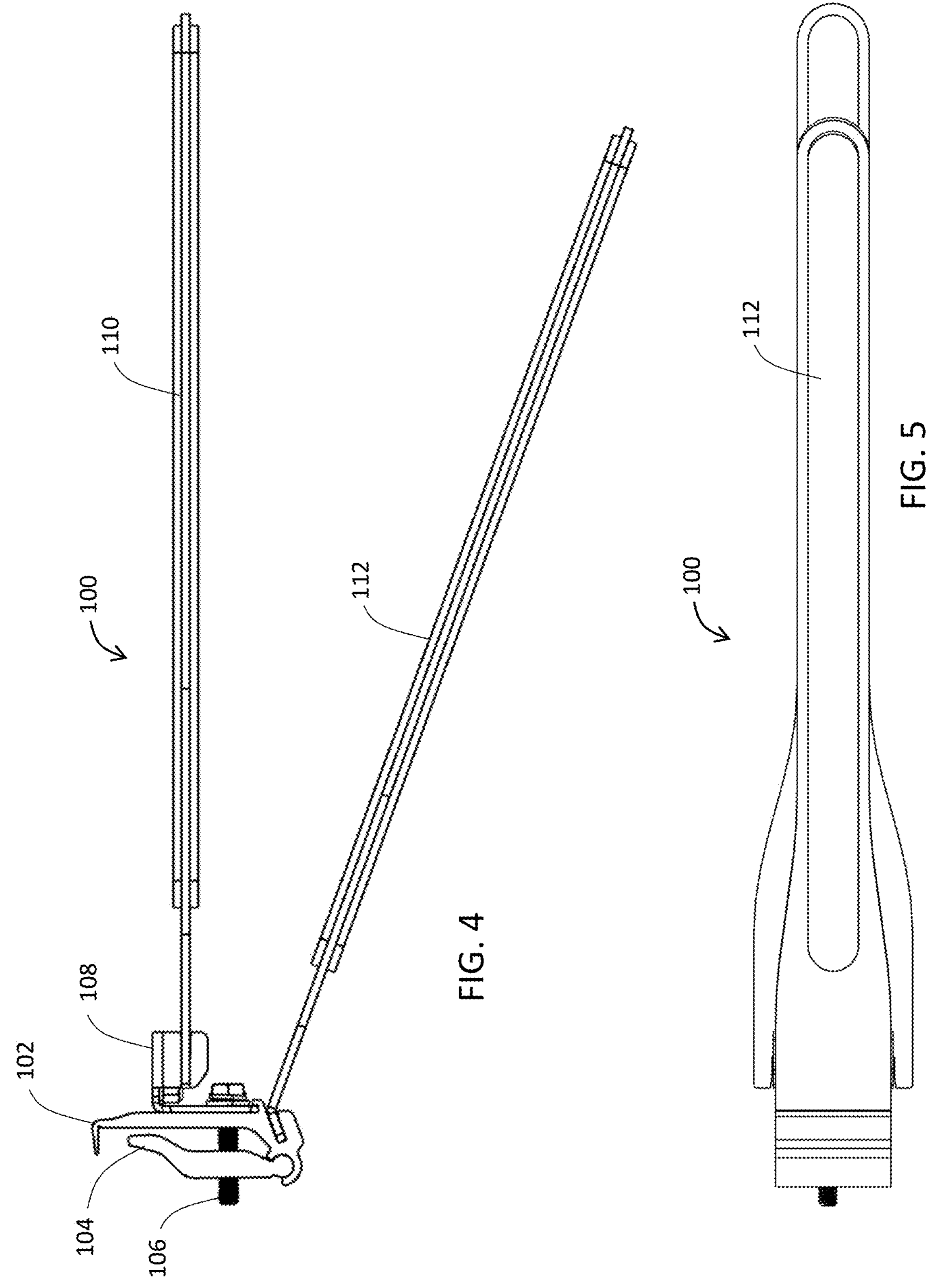
FIG. 4 is a left side profile view of the clamp of FIG. 1.
FIG. 5 is a bottom view of the clamp of FIG. 1.
Figure 7:
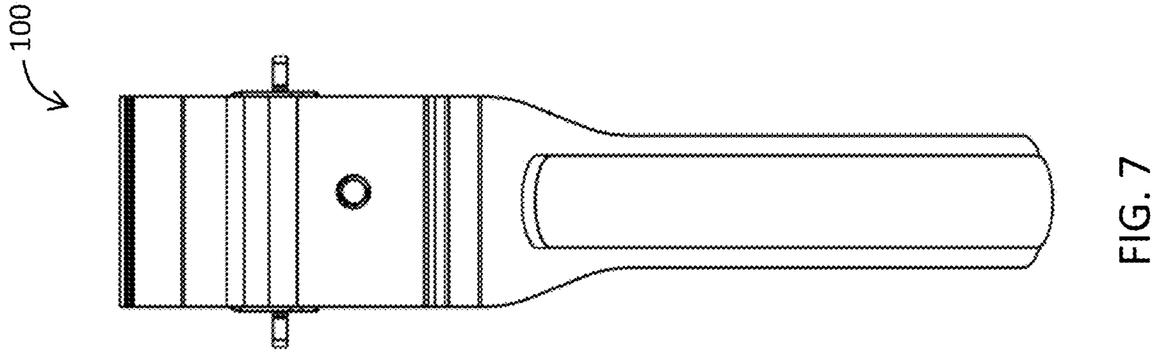
FIG. 7 is a rear view of the clamp of FIG. 1.
Figure 6:
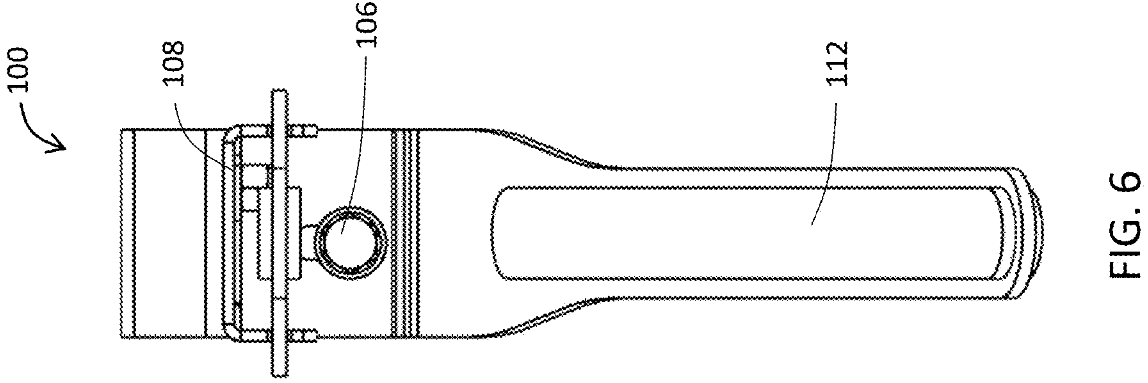
FIG. 6 is a front view of the clamp of FIG. 1.

Reference will now be made in detail to exemplary aspects of the present disclosure that are illustrated in the accompanying drawings. Wherever possible, the same reference numbers will be used throughout the drawings to refer to the same or like parts.

Referring to FIGS. 1-7, different views of a clamp 100 for securing a portion of the tonneau cover to a pickup truck box is depicted in accordance with an embodiment of the disclosure. With additional reference to FIGS. 8-9, the clamp 100 can include a first jaw member 102, a second jaw member 104, a threaded member 106, a bracket member 108, a first lever arm 110, and a second lever arm 112.

In embodiments, the first jaw member 102 can define a first contact surface 114 configured to contact a portion of the pickup truck box. The second jaw member 104 can be pivotably coupled to the first jaw member 102 and can define a second contact surface 116 configured to contact a portion of the pickup truck box. The threaded member 106 can be operably coupled to the first jaw member 102 and the second jaw member 104, and can be configured to pivot the second jaw member 104 relative to the first jaw member 102 to adjust the distance between the first contact surface 114 and the second contact surface 116 to selectively exert a gripping pressure on a portion (e.g., a flange, etc.) of the pickup truck box.

As depicted, in some embodiments, the first and second contact surfaces 114, 116, can be generally oriented towards one another, thereby enabling the first and second contact surfaces 114, 116 to exert a gripping pressure on objects placed therebetween. In some embodiments, the first and second contact surfaces 114, 116 can include knurling, teeth or serrations 120. In some embodiments, the first jaw member 102 can further define a third contact surface 122, which can be positioned substantially orthogonal to the first contact surface 114, such that the clamp 100 can grip or contact three sides of a flange or other structure defined by the pickup truck box. For improved grip over a range of pivot angles between the first jaw member 102 and the second jaw member 104, in some embodiments, the first and second contact surfaces 114, 116 can be curved or otherwise include a nonplanar contact surface.

Figure 11:
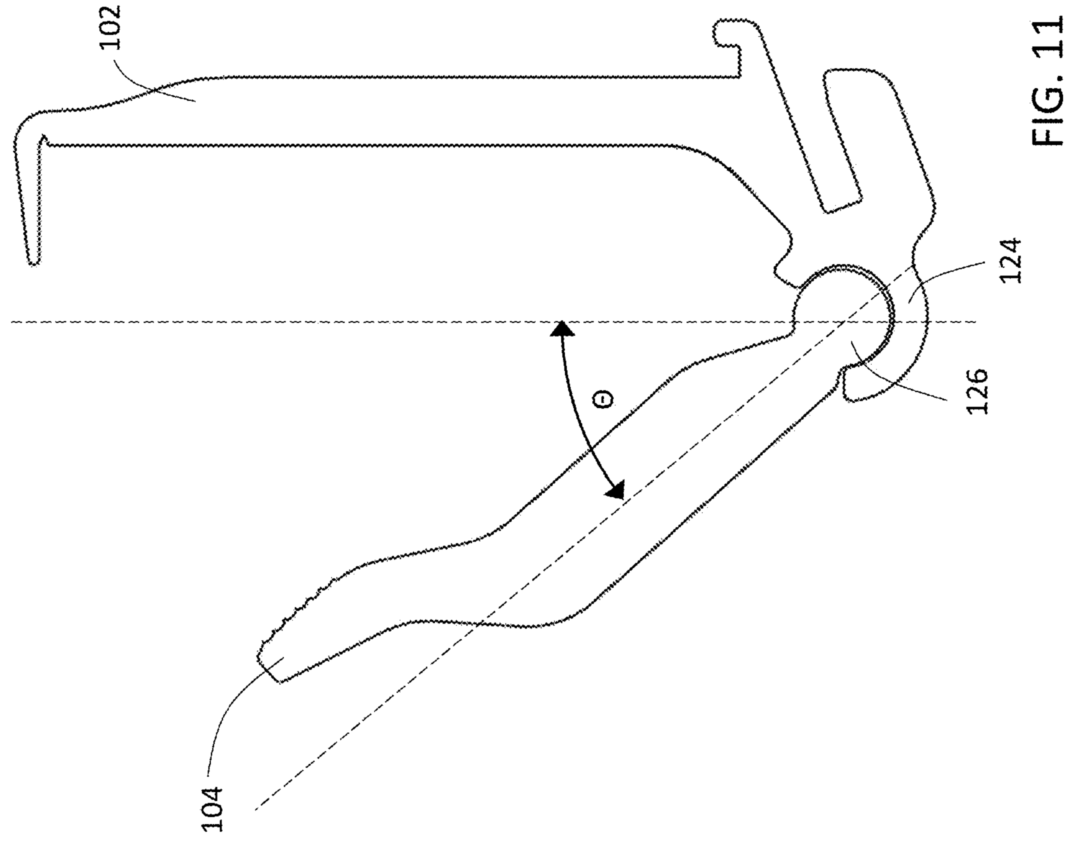
FIG. 11 is a profile view depicting the first and second jaw members of FIG. 8 in an open position, in accordance with an embodiment of the disclosure.
Figure 10:
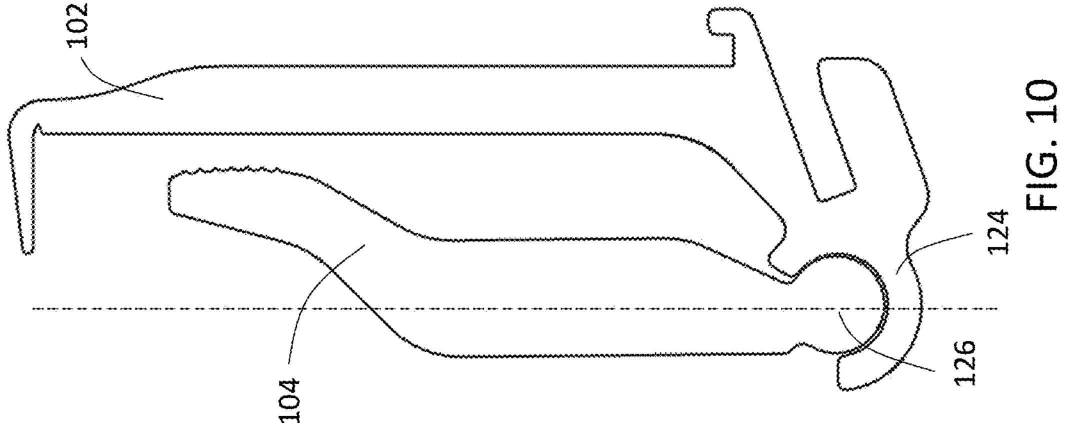
FIG. 10 is a profile view depicting a first and second jaw member pivotably coupled to one another in a clamping position, in accordance with an embodiment of the disclosure.

In embodiments, the first jaw member 102 can define a first portion 124 of a pivot assembly, and the second jaw member 104 can define a second portion 126 of a pivot assembly. For example, as depicted, the first portion 124 can be a channel, and the second portion 126 can be a pin or other surface configured to pivot within the channel. As depicted in FIGS. 10-11, in some embodiments, the first jaw member 102 can be configured to pivot relative to the second jaw member 104 within an angular range Θ, which may span from approximately 0° to about 60° (e.g., 45°, etc.), thereby enabling the jaw members of the clamp 100 to be opened for the positioning of a portion of the pickup truck box therein. Other pivotable connections and extension angles are also contemplated.

Pivoting of the first jaw member, relative to the second jaw member 104 can be controlled by rotation of the threaded member 106. For example, in some embodiments, an elongate portion of the threaded member 106 can pass through an aperture 128 defined by the first jaw member 102, with a head of the threaded member unable to pass through the aperture 128. The second jaw member 104 can define a threaded aperture 130 for threaded receipt of the elongate portion of the threaded member 106. Thereafter, as the threaded member 106 is threaded into the threaded aperture 130 the first jaw member 102 is urged toward the second jaw member 104 about the pivotal connection between the first jaw member 102 and the second jaw member 104. In some embodiments, the aperture 128 can be configured as an elongated slot to enable the threaded member 106 to pass therethrough over a range of angles. Further, in some embodiments, a washer 132 and lock ring 134 can be employed to inhibit inadvertent loosening of the clamp 100 over time.

Figure 8:
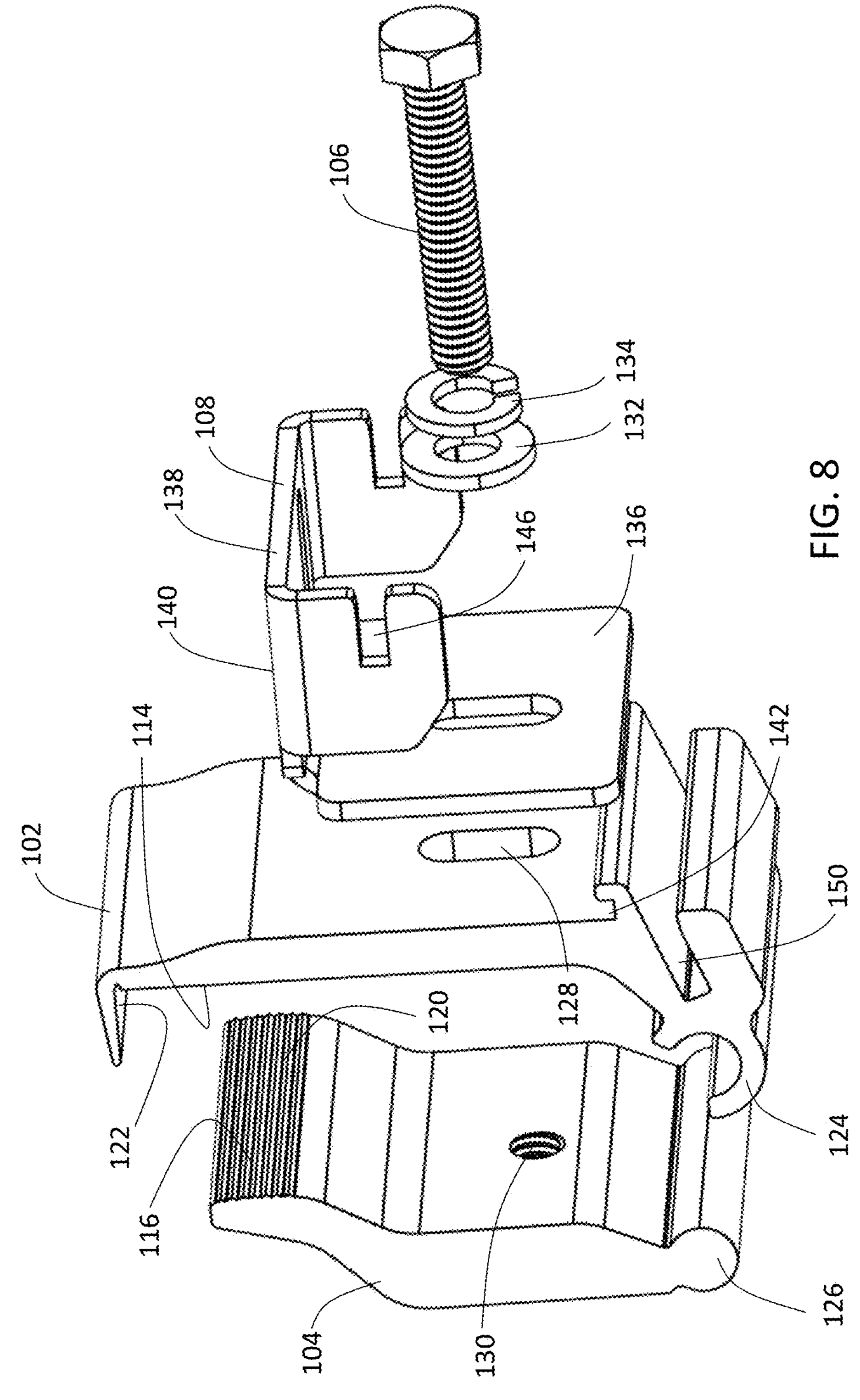
FIG. 8 is an exploded, perspective view depicting a portion of the clamp of FIG. 1 with a first and second lever arm removed, in accordance with an embodiment of the disclosure.
Figure 9:
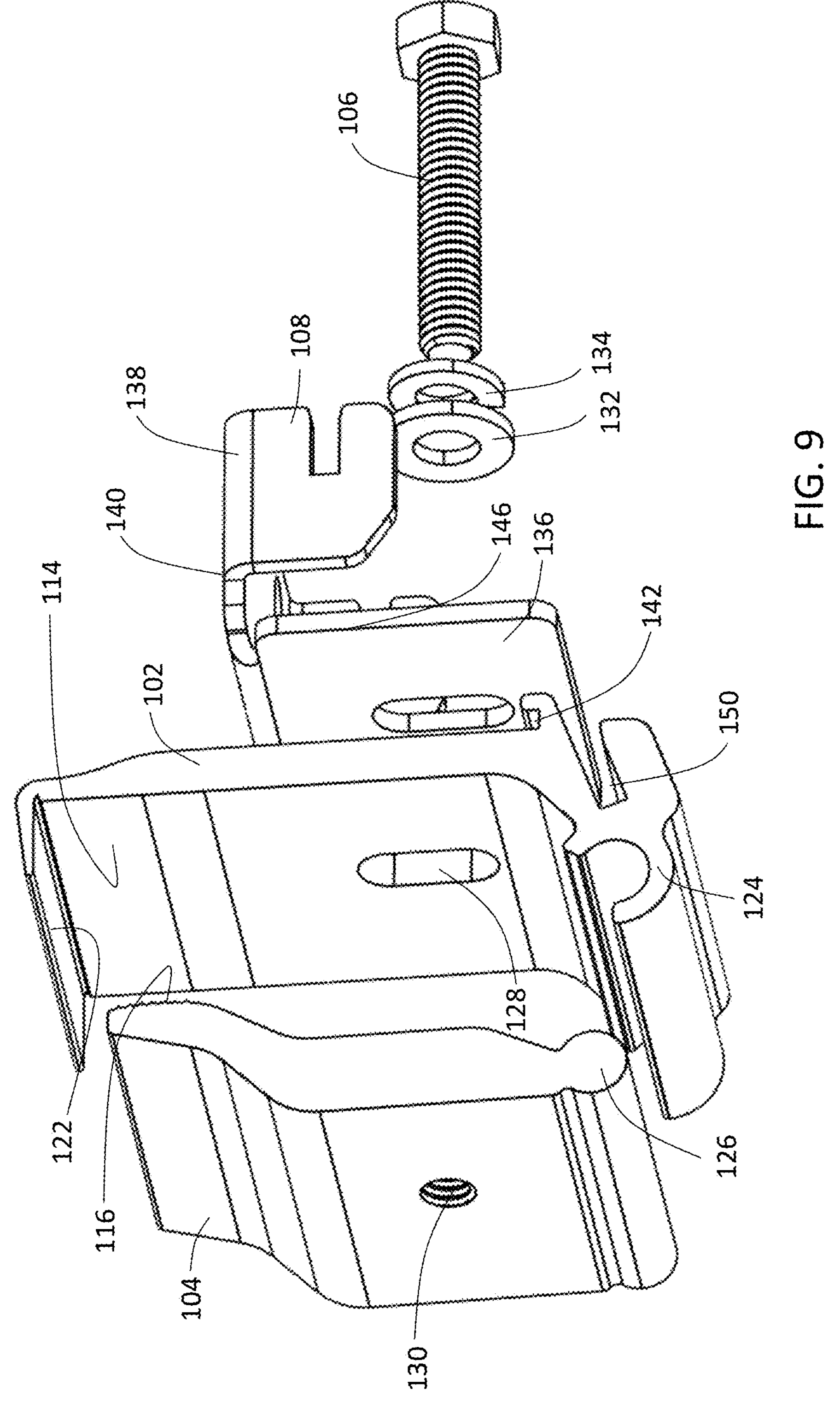
FIG. 9 is an alternative exploded, perspective view depicting the portion of the clamp of FIG. 8.

With continued reference to FIGS. 8-9, the bracket member 108 can include a first portion 136 operably coupled to the first jaw member 102 and a second portion 138 extending away from the first portion 136 at an angle (e.g., an angle of between about 85° and about 95°, etc.). In embodiments, the second portion 138 can define a mounting surface 140 for mounting a portion of the tonneau cover (e.g., side rails, panels, brackets, etc.). For example, in some embodiments, the mounting surface 140 can define an aperture 144 configured to receive a fastener for securing a portion of the tonneau cover to the bracket member 108.

Figure 12:
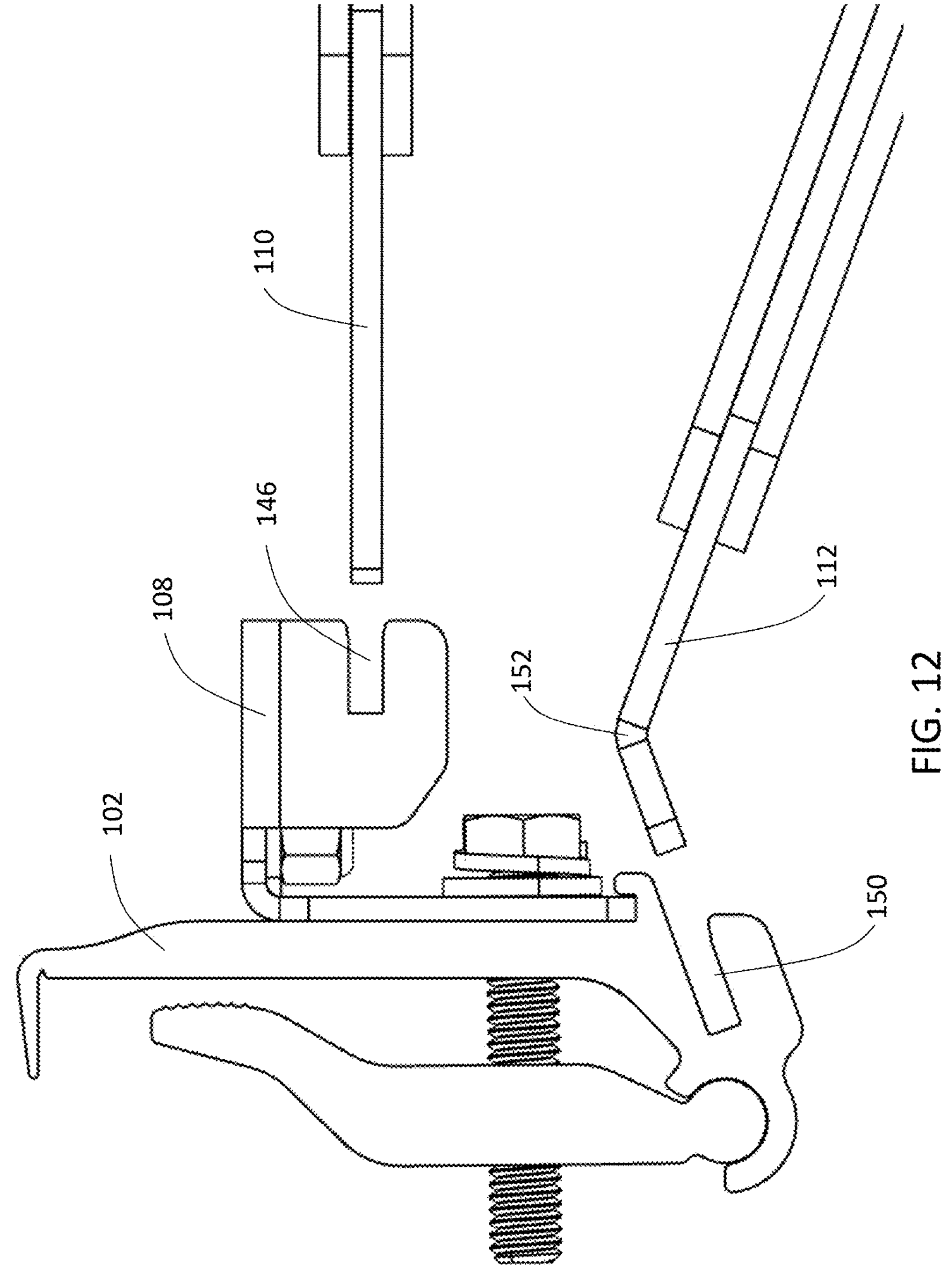
FIG. 12 is a profile view depicting a coupling of a first and second lever arm to a clamp, in accordance with an embodiment of the disclosure.

As further depicted in FIG. 12, the first lever arm 110 can be configured to selectively mate with the bracket member 108, and the second lever arm 112 can be configured to selectively mate with the first jaw member 102. In embodiments, application of opposing forces on the first and second lever arms 110, 112 enable adjustment of the angle between the first portion 136 and the second portion 138 of the bracket member 108 to enable leveling of the mounting surface 140 for improved fit of the tonneau cover to the pickup truck box. For example, in some embodiments, multiple clamps 100 may be employed, wherein each of the mounting surfaces 140 may be leveled relative to one another to establish a more level mounting plane.

Figure 13:
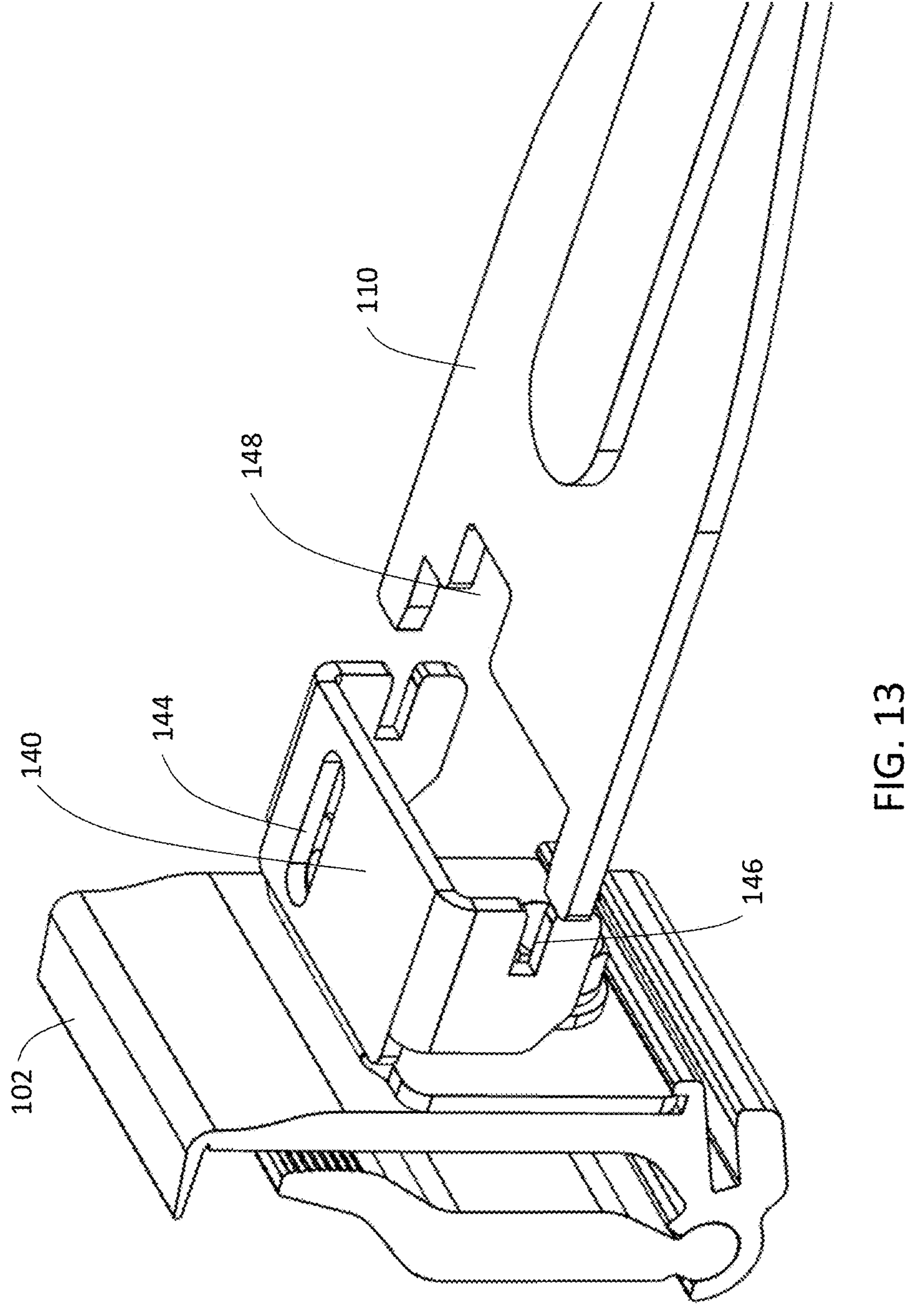
FIG. 13 is a close-up perspective view depicting a coupling between a first lever arm and a clamp, in accordance with an embodiment of the disclosure.
Figure 14:
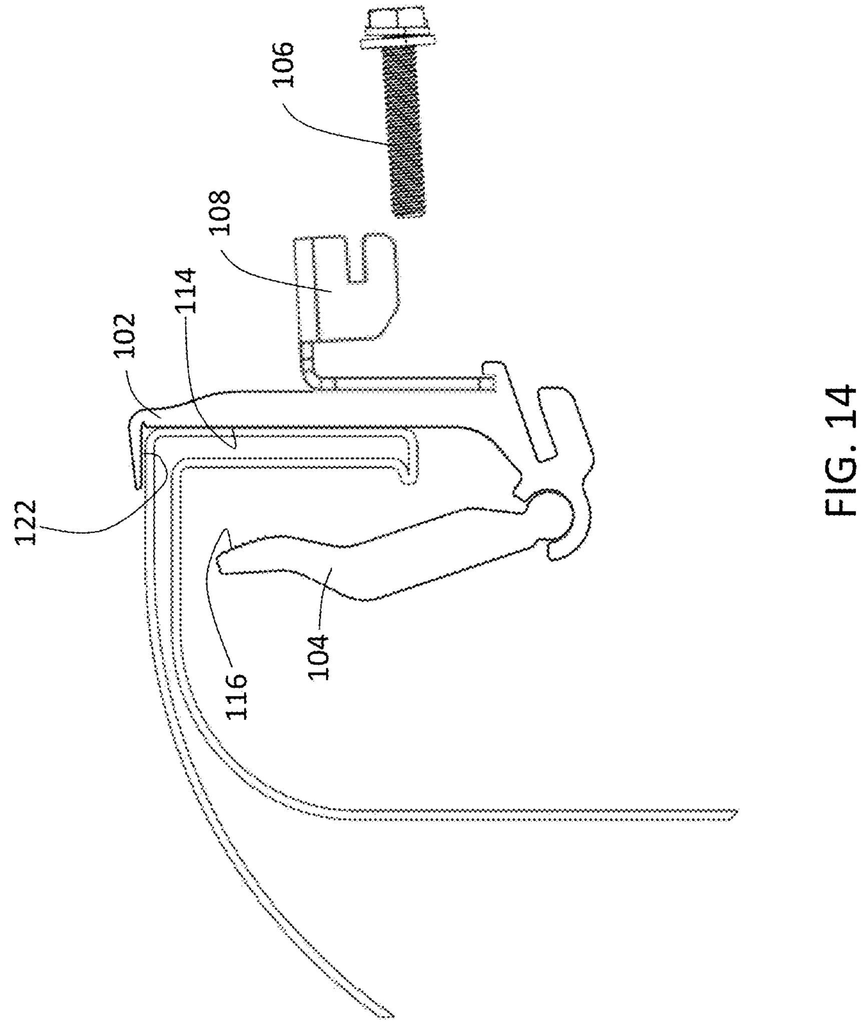
FIG. 14 is a cross-sectional view depicting clamping a clamp onto a portion of a truck bed, in accordance with an embodiment of the disclosure.
Figures 15, 16:
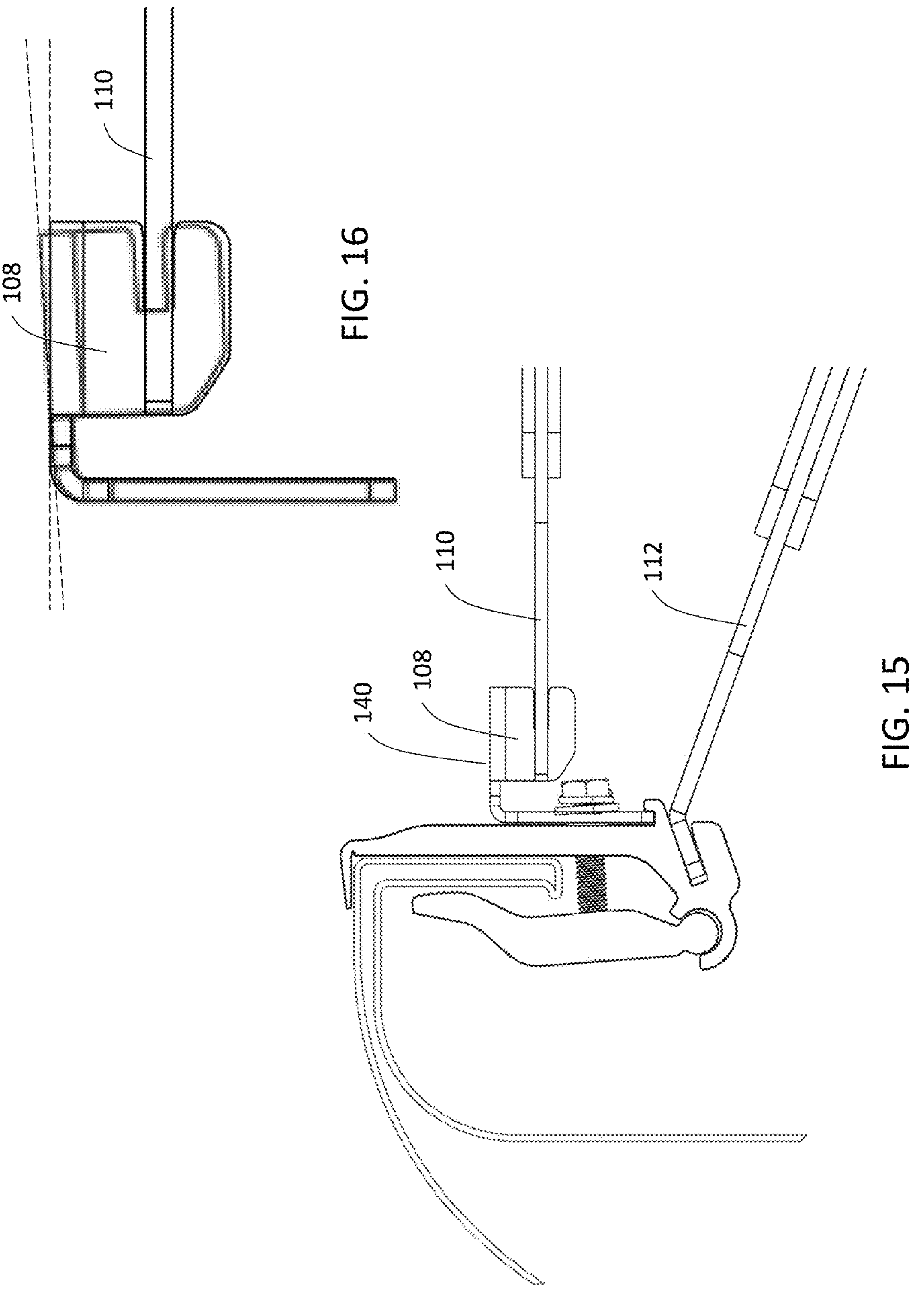
FIG. 15 is a cross-sectional view depicting bending a portion of a clamp with a lever to establish a level mounting surface, in accordance with an embodiment of the disclosure.
FIG. 16 is a close-up profile view depicting a bracket member of the clamp of FIG. 15 plasticly deformed to a desired degree of bend, in accordance with an embodiment of the disclosure.
Figure 17:
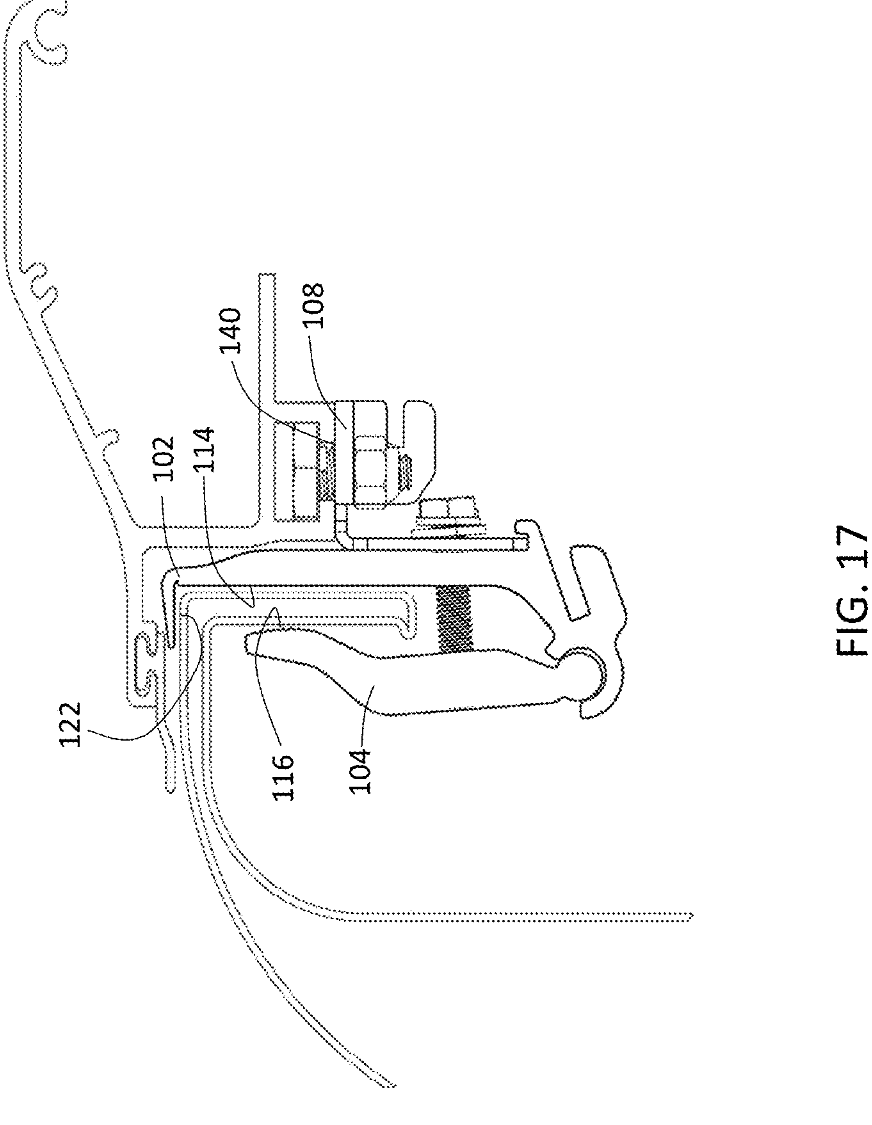
FIG. 17 is a cross-sectional view depicting a portion of a tonneau coupled to the clamp of FIG. 16, in accordance with an embodiment of the disclosure.
Figure 18:
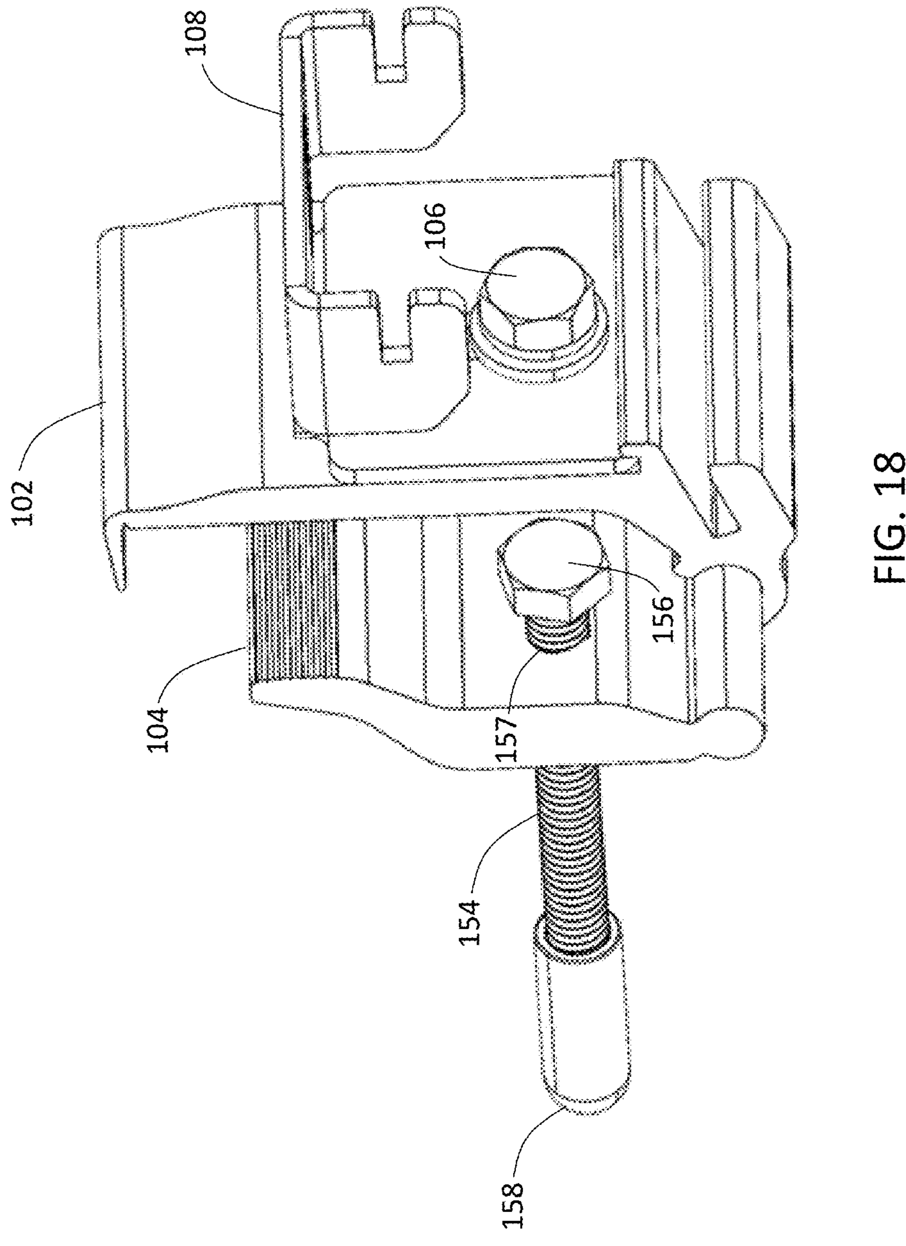
FIG. 18 is a perspective view depicting a clamp having a lever adjustable mounting surface for securement of a tonneau cover to a pickup truck box, in accordance with an alternate embodiment of the disclosure.
Figure 19:
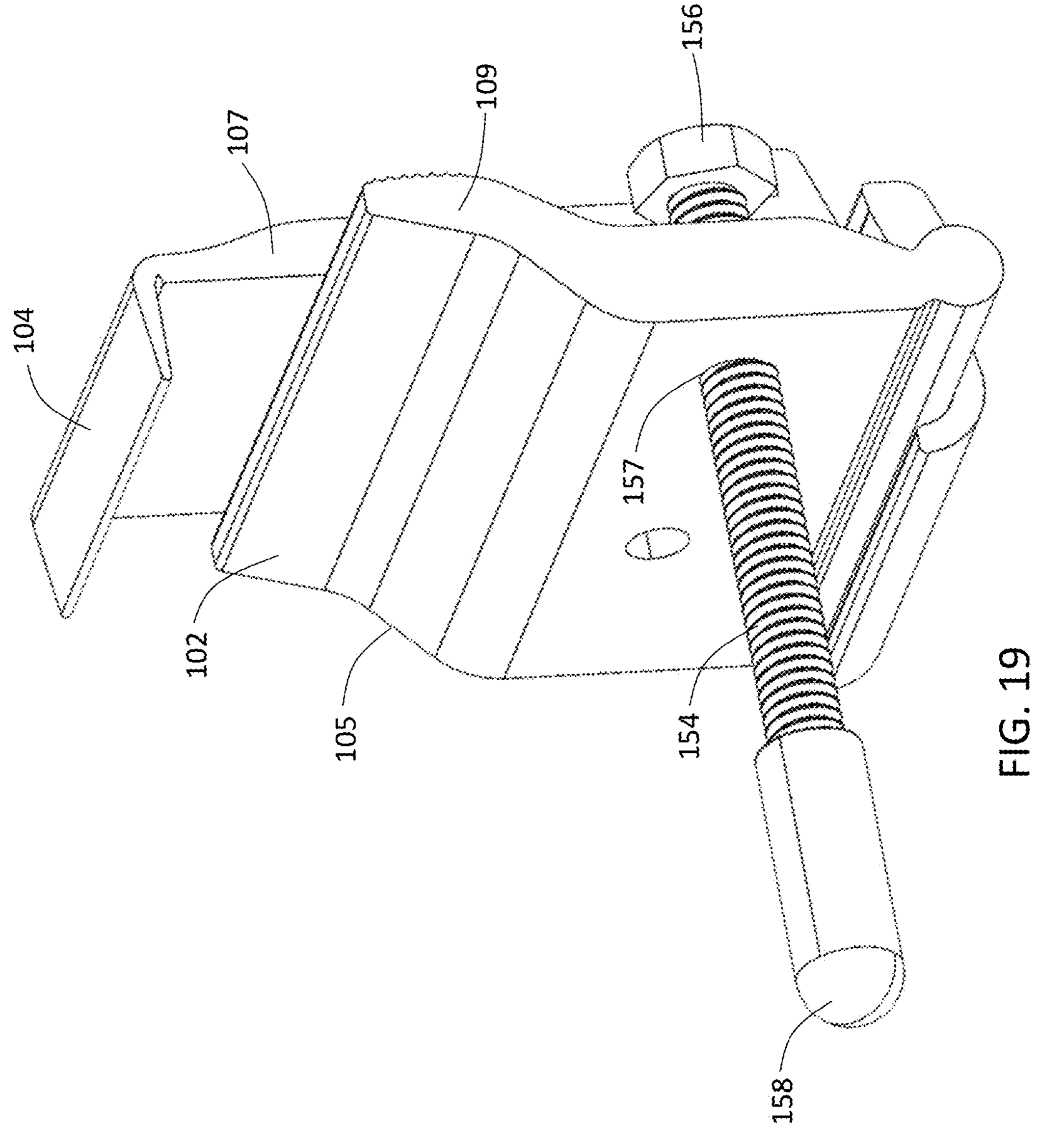
FIG. 19 is an alternate perspective view depicting the clamp of FIG. 18, in accordance with an embodiment of the disclosure.

To aid in coupling of the bracket member 108 to the first jaw member 102, in some embodiments, the bracket member 108 defines a first lever arm channel 146 configured to receive a portion of the first lever arm 110. For example, in some embodiments, the first lever arm channel 146 can be configured to establish free contact surfaces between the bracket member 108 and the first lever arm 110, wherein a first and second surface oppose one another and a third surface is positioned substantially orthogonal to the first and second surfaces. In some embodiments, the first lever arm 110 is keyed to fit within the first lever arm channel 146 to inhibit lateral motion of the first lever arm 110 relative to the bracket member 108 when the first lever arm 110 is inserted into the first lever arm channel 146. Further, in some embodiments, the first lever arm 110 defines a cutout 148 (as best depicted in FIG. 13) configured to enable insertion of a fastener into the aperture 144 defined by the mounting surface 140 of the bracket member 108, while the first lever arm 110 is positioned within the first lever arm channel 146.

In some embodiments, the first jaw member 102 can define a second lever arm channel 150 configured to receive a portion of the second lever arm 112. In some embodiments, the second lever arm channel 150 can be configured to establish three contact surfaces between the first jaw member 102 and the second lever arm 112, wherein a first and a second surface generally oppose one another, and a third surface is substantially orthogonal to the first and second surfaces.

In some embodiments, the first lever arm 110 extends outwardly from the clamp 100 and an acute angle relative to the second lever arm 112. For example, in some embodiments, the first lever arm 110 and the second lever arm 112 angle away from one another to provide a grip surface for improved manipulation of the bracket member 108, which may be plasticly deformed to establish a desired angle between the first portion 136 and the second portion 138. Further, in some embodiments, the second lever arm 112 can define a bend 152 and angled second lever arm channel 150 permitting a state of equilibrium between the second lever arm 112 and the first jaw member 102. In particular, the combination of the bend 152 and angled second lever arm channel 150 can serve to inhibit the second lever arm 112 from unintentionally dislodging or falling out of the second lever arm channel 150 when it is not being actively attended to.

With reference to FIGS. 13-17, in operation, leveling of the mounting surface of the clamp 100 involves rotating a threaded member to pivot a first jaw member 102 relative to a second jaw member 104 to exert a gripping force on a portion of a pickup truck box. Inserting a first lever arm 110 into the first lever arm channel 146 defined by the bracket member 108, followed by inserting a second lever arm 112 into the second level arm channel 150 defined by the first jaw member 102. By applying opposing forces on the first and second lever arms 110, 112, the bracket member 108 bends, resulting in the leveling of the mounting surface 140.

In some embodiments, portions of the clamp 100 can be fabricated through an extrusion process. For example, the first jaw member 102 and the second jaw member 104 can represent segments of an extrusion, cut to a dimension representing a width of the clamp 100, with one or more apertures 128, 130 drilled or machined into the extruded stock.

Figure 20:
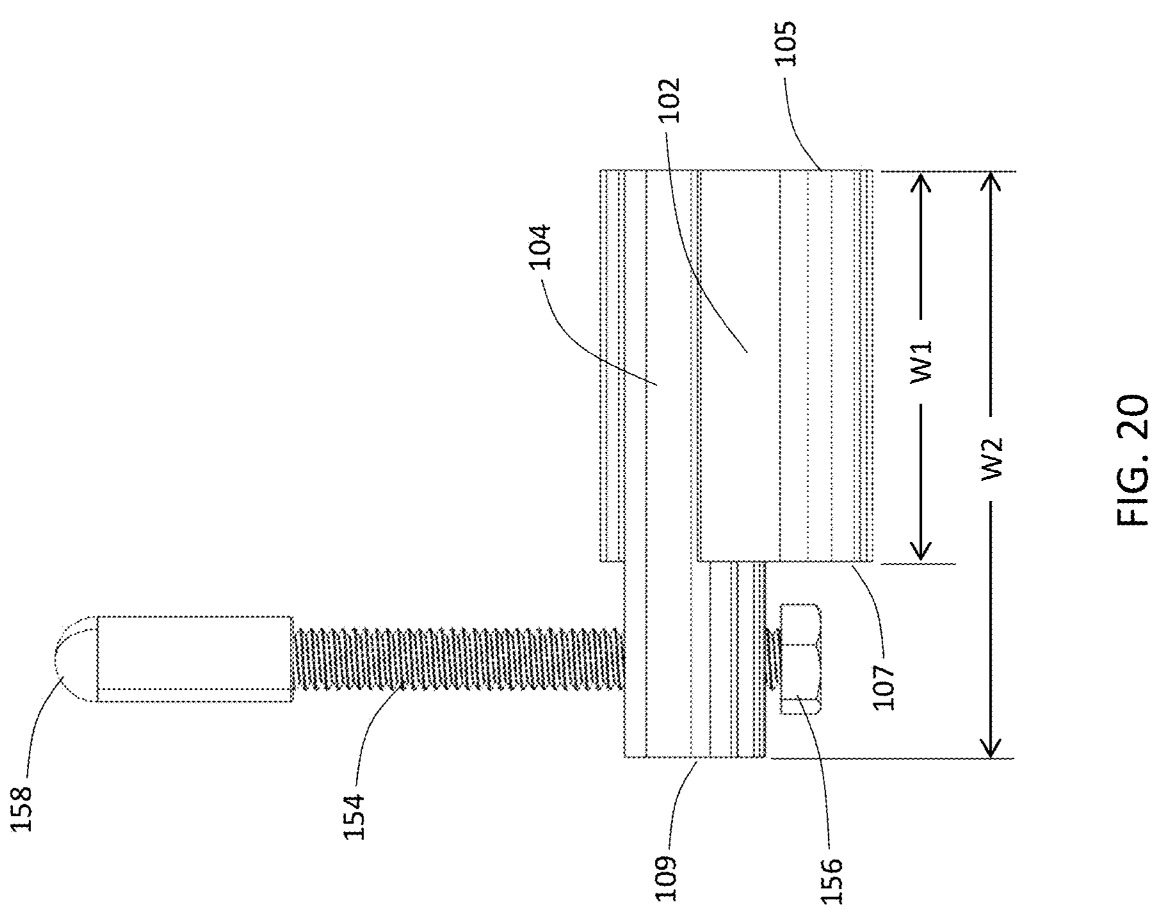
FIG. 20 is a plan view depicting a width of a first jaw member in comparison to a width of a second jaw member of the clamp of FIG. 18, in accordance with an embodiment of the disclosure.

With additional reference to FIGS. 18-21, in some embodiments, the clamp 100 can be defined by a first jaw member 102 having a first width (W1), and a second jaw member 104 having a second width (W2), wherein the second width is greater than or equal to the first width (e.g., W2≥W1), as best depicted in FIG. 20. For example, in embodiments, the clamp 100 can have a first side 105 representing a first side of both the first jaw member 102 and the second jaw member 104, particularly where the first sides 105 of both the first jaw member 102 and the second jaw member 104 are aligned such that the first sides 105 are positioned coplanar to one another. The first width (W1) can be defined between the first side 105 and a second side 107 of the first jaw member 102, while the second width W2 can be defined between the first side 105 and a second side 109 of the second jaw member 104.

In embodiments, the second width (W2) of the second jaw member 104 can extend beyond the first width (W1) first jaw member 102. For example, W2 can be in a range of between about 1.1 times W1 and about 2 times W1. In embodiments, increasing the width (W2) of the second jaw member 104 serves to both disburse pressure generated at the second contact surface 116 over a greater surface area, as well as to provide a mounting surface for a stabilizer bar 154, which can aid in maintaining a secure clamping force on the pickup truck box.

For example, in some embodiments, the second jaw member 104 can define an aperture 157 configured to receive a portion of the stabilizer bar 154. For example, in some embodiments, the stabilizer bar 154 can be a threaded elongate member having a head 156 and a contact portion 158. To inhibit damage to the pickup truck box and to ensure a solid connection, in some embodiments, the contact portion 158 can be in the form of a nonmetallic element having deformable qualities, thereby enabling the contact portion 158 to partially conform to a surface of the pickup truck box.

Figure 21:
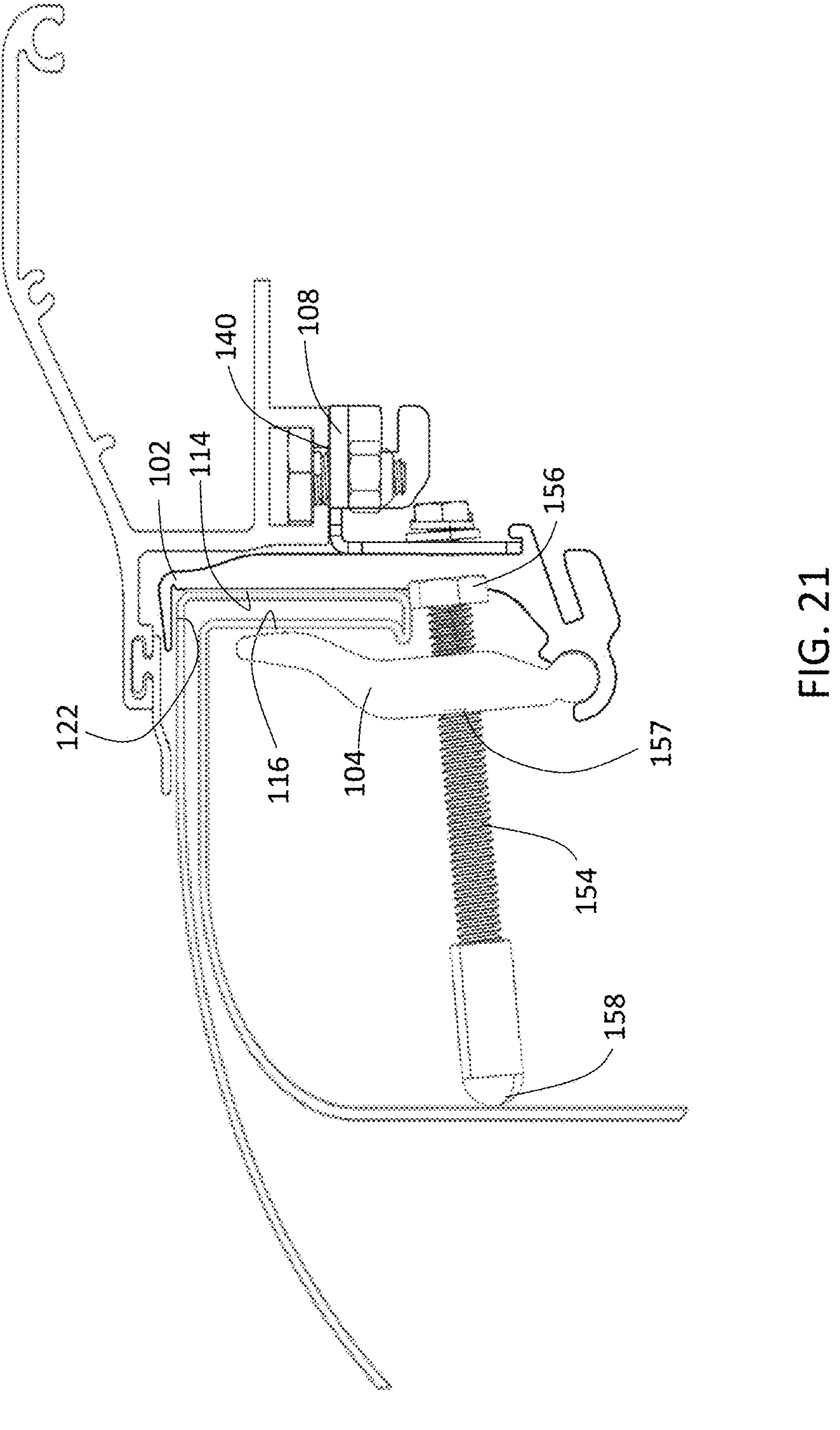
FIG. 21 is a cross-sectional view depicting a portion of a tonneau coupled to the clamp of FIG. 18, in accordance with an embodiment of the disclosure.

As best depicted in FIG. 21, in operation, the head 156 of the stabilizer bar 154 can be rotated relative to the second jaw member 104, thereby causing the contact portion 158 to extend outwardly away from the second jaw member 104 and into contact with a portion of the pickup truck box. Further rotation of the head 156 can cause the stabilizer bar 154 to exert a compressive force between the contact portion 158 and the aperture 157, which can have the effect of inhibiting the flange of the pickup truck box upon which the first and second contact surfaces 114, 116 are gripping from bending inwardly towards a side wall of the pickup truck box, and also to maintain a pressure between the pickup truck box and the second contact surface 116 of the second jaw member 104. Consequently, including a stabilizer bar 154 may be advantageous in certain embodiments to enhance a stabilization of the clamp 100.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A clamp for securing a portion of a tonneau cover to a flange of pickup truck box, the clamp comprising:

a first jaw member defining a first contact surface configured to contact the flange of the pickup truck box;

a second jaw member pivotably coupled to the first jaw member, the second jaw member defining a second contact surface configured to contact the flange of the pickup truck box, wherein the second contact surface is oriented toward the first contact surface;

a threaded member operably coupled to the first jaw member and the second jaw member, and configured to pivot the second jaw member relative to the first jaw member to adjust a distance between the first contact surface and the second contact surface to selectively exert a gripping pressure on the flange of the pickup truck box;

a bracket member including a first portion operably coupleable to the first jaw member and a second portion extending away from the first portion at an angle, the second portion defining a mounting surface for the portion of the tonneau cover;

a first lever arm configured to selectively mate with the bracket member; and a second lever arm configured to selectively mate with the first jaw member, wherein application of opposing forces on the first lever arm and the second lever arm enable adjustment of the angle between the first portion and the second portion of the bracket member to enable leveling of the mounting surface for an improved fit of the tonneau cover to the pickup truck box.

2. The clamp of claim 1, wherein the first jaw member defines a third contact surface oriented substantially orthogonal to the first contact surface.

3. The clamp of claim 1, wherein the second contact surface defined by the second jaw member defines knurling, teeth or serrations configured to increase a frictional resistance between the second contact surface and the flange of the pickup truck box.

4. The clamp of claim 1, wherein the second contact surface defined by the second jaw member is curved for improved contact with the flange of the pickup truck box over a range of pivot angles between the first jaw member and the second jaw member.

5. The clamp of claim 1, wherein the first jaw member defines an aperture shaped and sized to enable a portion of the threaded member to pass therethrough.

6. The clamp of claim 1, wherein the second jaw member defines a threaded aperture for receipt of a portion of the threaded member.

7. The clamp of claim 1, wherein the first jaw member defines a first component of a pivot assembly and the second jaw member defines a second component of the pivot assembly pivotably coupling the first jaw member to the second jaw member.

8. The clamp of claim 1, wherein the first jaw member is configured to pivot relative to the second jaw member over a range of less than about 60°.

9. The clamp of claim 1, wherein the first jaw member defines a bracket member channel configured to receive a portion of the bracket member to establish three contact surfaces between the first jaw member and the bracket member, wherein the first contact surface and the second contact surface oppose one another and a third contact surface is orthogonal to the first contact surface and the second contact surface.

10. The clamp of claim 1, wherein the bracket member defines a first lever arm channel configured to receive a portion of the first lever arm to establish three contact surfaces between the bracket member and the first lever arm, wherein a first and second surface oppose one another and a third contact surface is orthogonal to the first contact surface and the second contact surface.

11. The clamp of claim 10, wherein the first lever arm is keyed to fit within the first lever arm channel to inhibit lateral motion of the first lever arm relative to the bracket member when the first lever arm is inserted into the first lever arm channel.

12. The clamp of claim 11, wherein the mounting surface of the bracket member defines an aperture configured to receive a fastener for securing the portion of the tonneau cover to the bracket member.

13. The clamp of claim 12, wherein the first lever arm defines a cutout configured to enable insertion of the fastener into the aperture defined by the mounting surface of the bracket member when the first lever arm is positioned within the first lever arm channel.

14. The clamp of claim 1, wherein the first jaw member defines a second lever arm channel configured to receive a portion of the second lever arm to establish three contact surfaces between the first jaw member and the second lever arm, wherein a first and second surface oppose one another and a third contact surface is orthogonal to the first contact surface and the second contact surface.

15. The clamp of claim 1, wherein a first lever arm channel is angled relative to a second lever arm channel.

16. The clamp of claim 1, wherein the second lever arm defines a bend configured to promote a static equilibrium of the second lever arm relative to the first jaw member when the second lever arm is inserted into a second lever arm channel to inhibit the second lever arm from falling out of the second lever arm channel when left unattended.

17. The clamp of claim 1, wherein one or more features of at least one of the first jaw member or the second jaw member are defined by an extrusion process.

18. The clamp of claim 1, wherein the first jaw member defines a first width, and the second jaw member defines a second width, wherein the second width is greater or equal to the first width.

19. The clamp of claim 1, further comprising a stabilizer bar threadably coupled to the second jaw member, wherein the stabilizer bar defines a contact element configured to contact a portion of the pickup truck box.

20. A tonneau cover clamp, comprising:

a first jaw member;

a second jaw member pivotably coupled to the first jaw member;

a threaded member configured to pivot the second jaw member relative to the first jaw member to exert a gripping pressure;

a bracket member including a first portion operably coupleable to the first jaw member and a second portion extending away from the first portion at an angle, the second portion defining a mounting surface for the tonneau cover clamp;

a first lever arm configured to selectively mate with the bracket member; and a second lever arm configured to selectively mate with the first jaw member to enable adjustment of the angle between the first portion and the second portion of the bracket member.

21. The tonneau cover clamp of claim 20, wherein the first jaw member defines a first contact surface and the second jaw member defines a second contact surface, and wherein the second contact surface is oriented toward the first contact surface.

22. A method of leveling a tonneau cover clamp, comprising:

rotating a threaded member configured to pivot a first jaw member relative to a second jaw member to exert a gripping force between the first jaw member and the second jaw member on a portion of a pickup truck box, wherein a bracket member defining a mounting surface is operably coupled to the first jaw member;

inserting a first lever arm into a first channel defined by the bracket member;

inserting a second lever arm into a second channel defined by the first jaw member; and applying an opposing force on the first lever arm and the second lever arm, thereby causing the bracket member to bend for leveling of the mounting surface.

* * * * *